Oct. 6, 1942.         R. E. MARBURY              2,298,141
                      TERMINAL DEVICE
                    Filed March 7, 1942
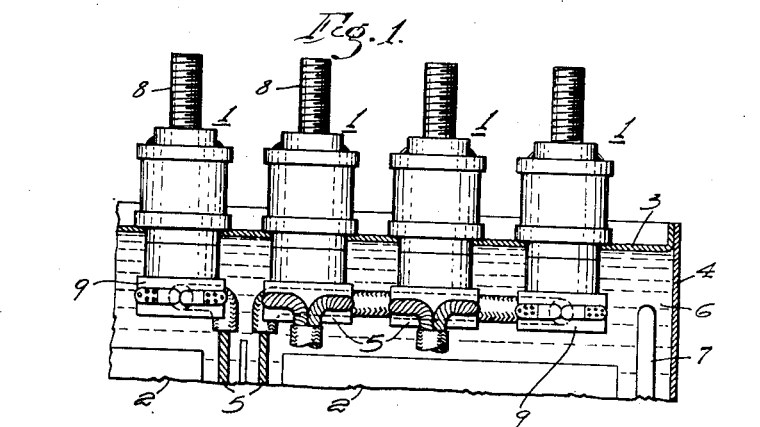
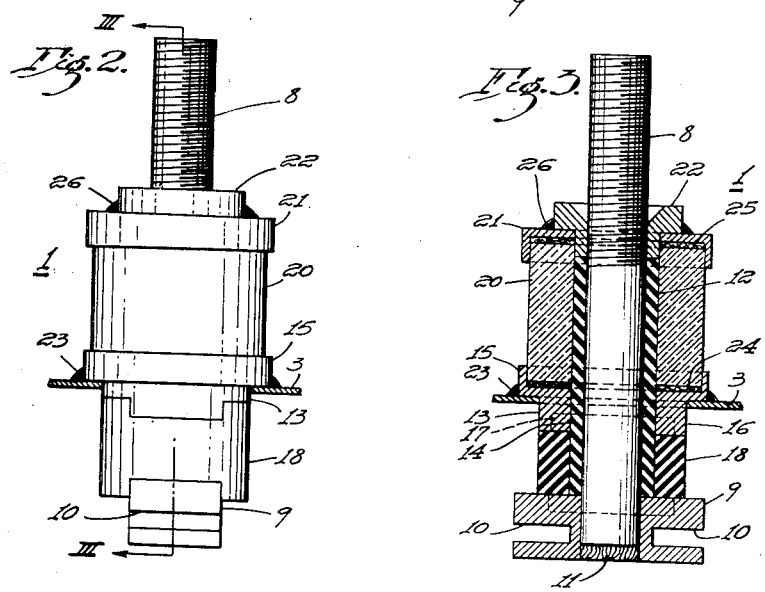
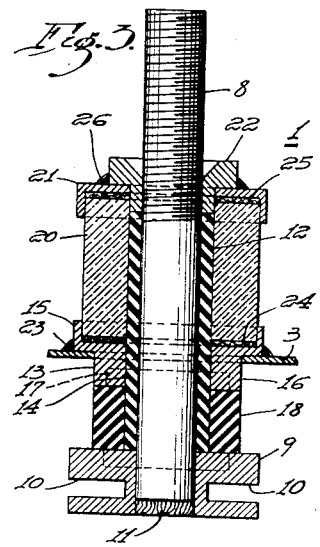
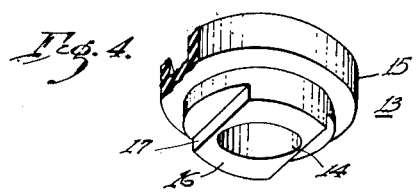
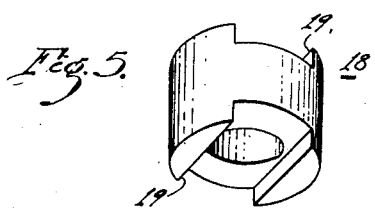
INVENTOR
Ralph E. Marbury.
BY
ATTORNEY Patented Oct. 6, 1942

2,298,141

UNITED STATES PATENT OFFICE 2,298,141

TERMINAL DEVICE

Ralph E. Marbury, Wilkinsburg, Pa., assignor to Westinghouse Electric & Manufacturing Company, East Pittsburgh, Pa., a corporation of Pennsylvania Application March 7, 1942, Serial No. 433,786

6 Claims. (Cl. 174—31)

The present invention relates to terminals for electrical apparatus of the type which is enclosed in a sealed, liquid-filled housing or casing, such as capacitors.

The terminal device of the present invention is especially adapted for use on capacitors, although it is not limited to this particular application and may be used on any type of electrical apparatus which is enclosed in a sealed housing. Capacitors of the type used for power-factor correction consist of a plurality of individual windings or sections made up of interleaved layers of metal foil and thin paper dielectric, and contained in a sheet metal case or housing, which is filled with a suitable liquid insulating compound. The terminals used on capacitors of this type must be sealed in the housing in order to prevent leakage of the liquid, or entrance of moisture, which would impair the dielectric strength of the liquids.

One type of terminal which has been successfully used in capacitors consists of a terminal stud extending through a porcelain bushing, which is sealed in the top wall or cover of the housing by soldering the metal cover directly to a metallic glaze on the surface of the porcelain. There are certain types of capacitors, however, on which terminal devices of this type cannot be used. Thus, water-cooled capacitor units, such as are used for high-frequency service, as in induction heating installations, have very high capacity, and consequently carry very heavy currents, which may be as high as 1200 or even 1500 amperes, so that it is often necessary to use two or more terminals connected in parallel to handle the heavy current. These terminals are connected together and to the external circuit by heavy copper bus bars, and they must be strong enough to withstand the mechanical stresses which are imposed on them. These terminals must also have high current carrying ability, of the order of at least 300 amperes, but the relatively small size of capacitor units of this type makes it necessary to space the terminals quite closely together, so that they must be made relatively small. For this reason, it is not practical to use soldered porcelain terminals, or other conventional types of terminal devices, on such capacitors, since it is impossible to make these terminals sufficiently strong mechanically, and with sufficient current carrying capacity, for the available space.

The principal object of the present invention is to provide a terminal device for capacitors, or similar apparatus, which is of relatively small size but which has good mechanical strength and high current carrying capacity.

Another object of the invention is to provide a terminal device for use with electrical equipment of the type enclosed in a sealed housing, such as capacitors, which can be assembled from the outside after the housing is closed, and in which the terminal stud is locked against rotation so that there is no danger of displacement or breakage of the internal leads during assembly of the terminal device.

A still further object of the invention is to provide a terminal device for capacitors, or similar electrical apparatus enclosed in a sealed housing, which is of simple and inexpensive construction, and in which damage to the seal or breakage of the terminal can readily be repaired from the outside of the housing.

Other objects and advantages of the invention will be apparent from the following detailed description, taken in connection with the accompanying drawing, in which, Figure 1 is a fragmentary sectional view of a water-cooled capacitor, showing the use of the terminal device of the present invention, Fig. 2 is an elevation of a terminal device, Fig. 3 is a sectional view on the line III—III of Fig. 2, Fig. 4 is a perspective view of a bushing, and Fig. 5 is a perspective view of a locking member.

Figure 1 shows a plurality of terminal devices 1 embodying the present invention mounted on a water-cooled capacitor of the type used for high-frequency service. The capacitor consists of a plurality of capacitor windings or sections 2, each of which is made up of layers of metal foil separated by thin paper dielectric, the foil and paper being wound together and flattened to form capacitor sections of the usual type. The sections 2 are contained in a relatively heavy sheet metal housing or case, which includes a cover member 3 welded or otherwise tightly sealed to the side walls 4. The individual capacitor sections 2 are connected together in any desired manner, and are connected to the terminals 1 by means of leads 5. The housing is filled with a suitable insulating liquid 6, and a cooling coil 7 is provided in the housing to withdraw the heat generated by the dielectric losses in the capacitor, so that a very high capacity is obtained. In the particular capacitor shown in the drawing, four terminals 1 are provided in order to handle the heavy current, and these terminals are connected in parallel to the external circuit. It will be understood, of course, that the terminal device of the present invention may be used equally well with other types of equipment which are enclosed in sealed liquid-filled housings and in which similar problems exist.

The terminal device 1 is shown in detail in Figs. 2 and 3. The current carrying member of the terminal comprises a central stud 8, preferably of copper, which is threaded at one end and which has a terminal block 9 at the other end. The terminal block 9 is generally rectangular in shape, and has a slot 10 cut in it at each side to facilitate connection of the leads. The terminal block 9 may be integral with the stud 8, or it may be a separate member secured to the lower end of the stud by soldering or brazing, as indicated at 11. The stud 8 is insulated from the cover 3 of the housing by a sleeve or tube 12 of insulating material, such as Micarta, which fits closely over the stud and which rests at its lower end on the terminal block 9.

The terminal stud 8 and sleeve 12 extend through a bushing 13 which is secured to the housing 3. The bushing 13 is preferably made of copper, although other suitable metals, such as brass, may be used, and it has a central opening 14 of large enough diameter to accommodate the insulating sleeve 12. The bushing has an enlarged upper portion 15 which is recessed so that it is generally cup-shaped, and it has a lower portion 16 of reduced diameter which extends through an opening in the housing 3. The lower portion 16 is cut away on opposite sides, as indicated at 17, to provide a generally rectangular portion on the part of the bushing which extends into the interior of the housing. A locking member 18 is also provided inside the housing. The locking member 18 consists of a tubular piece of insulating material having an internal diameter approximately the same as that of the opening 14 in the bushing 13. The locking member 18 has grooves 19 cut in its top and bottom which are adapted to engage the rectangular portion of the bushing 13, and the terminal block 9, respectively, to hold the terminal stud 8 against rotation during assembly of the terminal.

On the outside of the housing, the terminal device includes a tubular member 20, which may be of porcelain or of any other suitable insulating material, and which is adapted to fit over the outside of the sleeve 12 and to be received in the upper cup-shaped portion 15 of the bushing 13. A cap member 21, which may be of brass or copper, fits over the top of the tubular member 20, and a clamping nut 22 is threaded on the stud 8 to clamp the entire assembly together.

In assembling the terminal device, the leads 5 are first attached to the terminal stud 8, preferably by soldering them in the slots 10 of the terminal block 9. The bushing 13 is secured in the cover 3 of the housing, by soldering or brazing, as indicated at 23, to form a mechanically strong, liquid-tight joint. The insulating sleeve 12 and the locking member 18 are placed over the terminal stud 8 with the lower groove 19 in the locking member 18 engaging the terminal block 9. The cover 3 can then be placed in position in the housing with the terminal studs 8 of all the terminals 1 extending through their corresponding bushings 13, the rectangular portions 16 of the bushings being engaged in the upper grooves 19 of the locking members 18. The cover 3 is then welded or otherwise secured in position, and the capacitor, or other device, contained in the housing may be dried out and impregnated and the housing filled with liquid in the usual manner.

The assembly of the terminal 1 is readily completed after the housing has been closed and sealed. To complete the assembly, a gasket 24 is placed in the cup-shaped portion 15 of the bushing 13, and the tubular insulating member 20 is then placed over the sleeve 12 with its bottom resting on the gasket 24. An upper gasket 25 is then placed on top of the tubular member 20 and the cap 21 placed over the member 20 and gasket 25. The clamping nut 22 is then threaded on the stud 8 and screwed down against the cap 21 and tightened until the gaskets 24 and 25 are compressed sufficiently to seal the assembly against the escape of liquid from the housing, and until all of the parts are tightly held in position. The nut 22 is then preferably soldered to the cap 21, as indicated at 26, to maintain it in position, and to seal the joint between the nut and the cap against the escape of liquid or the entrance of moisture.

It should now be apparent, therefore, that a terminal device has been provided which is of relatively simple construction, but which can be designed to have high current carrying capacity and high mechanical strength with relatively small size, so that it is very suitable for applications such as water-cooled capacitors in which several closely spaced terminals are used to handle very heavy currents. The new terminal can readily be assembled from the outside of the housing after the housing has been closed, and the locking member 18 prevents rotation of the terminal stud during the assembly, so that there is no danger of the internal leads which are connected to it being displaced or broken by such rotation, which has been an objectionable feature of other types of terminals used in the past. The new terminal is effectively sealed by means of the gaskets 24 and 25 and the soldered joints 23 and 26, so that leakage of liquid from the housing and entrance of moisture into the housing are effectively prevented, and since these points are readily accessible, any damage to the seal or breakage of any part of the terminal device can easily be repaired without opening the housing.

It will be understood that, although the new terminal device has been described with particular reference to its use on capacitors, it is not restricted to this particular application but may be used with other types of equipment where similar problems are encountered. The invention is not limited to the precise details of construction shown in the drawing, since various modifications and changes may be made, and it is to be understood, therefore, that the invention is not restricted to this particular constructional embodiment, but in its broadest aspects it includes all equivalent embodiments and modifications which come within the scope of the appended claims.

I claim as my invention:

1. A terminal device for electrical apparatus of the type which is enclosed in a sealed housing, said terminal device comprising a terminal stud, an insulating sleeve on said stud, a bushing member secured in the housing, said terminal stud and sleeve extending through the bushing member, a locking member inside the housing, said locking member engaging the bushing member and the terminal stud to hold the stud against rotation, a tubular insulating member surrounding the terminal stud and sleeve on the outside of the housing, means for clamping said tubular member against said bushing member, and sealing means for preventing leakage of liquid from the housing through the terminal device.

2. A terminal device for electrical apparatus of the type which is enclosed in a sealed housing, said terminal device comprising a terminal stud, an insulating sleeve on said stud, a bushing member secured in the housing, said terminal stud and sleeve extending through the bushing member, said bushing member having a rectangular portion inside the housing, a locking member inside the housing engaging said rectangular portion of the bushing member and also engaging the terminal stud to lock the stud against rotation, a tubular insulating member surrounding the terminal stud and sleeve on the outside of the housing, means for clamping said tubular member against said bushing member, and sealing means for preventing leakage of liquid from the housing through the terminal device.

3. A terminal device for electrical apparatus of the type which is enclosed in a sealed housing, said terminal device comprising a terminal stud having a terminal block at one end thereof, an insulating sleeve on said stud, a bushing member secured in the housing, said terminal stud and sleeve extending through the bushing member with the terminal block inside the housing, said bushing member having a rectangular portion inside the housing, a tubular locking member encircling the terminal stud inside the housing, said locking member having a groove in one end thereof engaging said rectangular portion of the bushing member, and said locking member also having a groove in the other end thereof engaging said terminal block, whereby the terminal stud is locked against rotation, a tubular insulating member surrounding the terminal stud and sleeve on the outside of the housing, means for clamping said tubular member against said bushing member, and sealing means for preventing leakage of liquid from the housing through the terminal device.

4. A terminal device for electrical apparatus of the type which is enclosed in a sealed housing, said terminal device comprising a terminal stud, an insulating sleeve on said stud, a bushing member secured in the housing, said terminal stud and sleeve extending through the bushing member, a locking member inside the housing, said locking member engaging the bushing member and the terminal stud to hold the stud against rotation, a tubular insulating member surrounding the terminal stud and sleeve on the outside of the housing, said bushing member having a recess therein on the outside of the housing, and said tubular member resting in said recess, clamping means at the top of said tubular member for clamping the assembly together, and sealing means between the tubular member and the bushing member and between the tubular member and the clamping means.

5. A terminal device for electrical apparatus of the type which is enclosed in a sealed housing, said terminal device comprising a terminal stud, an insulating sleeve on said stud, a bushing member secured in the housing, said terminal stud and sleeve extending through the bushing member, a locking member inside the housing, said locking member engaging the bushing member and the terminal stud to hold the stud against rotation, a tubular insulating member surrounding the terminal stud and sleeve on the outside of the housing, said bushing member having a recess therein on the outside of the housing, and said tubular member resting in said recess, clamping means at the top of said tubular member for clamping the assembly together, said clamping means including a cap member extending over the top of said tubular member, a gasket between the tubular member and the bushing member, and a gasket between the tubular member and the cap member.

6. A terminal device for electrical apparatus of the type which is enclosed in a sealed housing, said terminal device comprising a terminal stud having a terminal block at one end thereof, an insulating sleeve on said stud, a bushing member secured in the housing, said terminal stud and sleeve extending through the bushing member with the terminal block inside the housing, said bushing member having a rectangular portion inside the housing, a tubular locking member encircling the terminal stud inside the housing, said locking member having a groove in one end thereof engaging said rectangular portion of the bushing member, and said locking member having a groove in the other end thereof engaging said terminal block, whereby the terminal stud is locked against rotation, a tubular insulating member surrounding the terminal stud and sleeve on the outside of the housing, said bushing member having a recess therein on the outside of the housing, and said tubular member resting in said recess, clamping means at the top of said tubular member for clamping the assembly together, said clamping means including a cap member extending over the top of said tubular member, a gasket between the tubular member and the bushing member, and a gasket between the tubular member and the cap member.

RALPH E. MARBURY.